United States Patent
Liou

(10) Patent No.: US 10,793,410 B2
(45) Date of Patent: Oct. 6, 2020

(54) PRYING TOOL CAPABLE OF CHANGING ARRANGEMENT OF PRYING MEMBERS THEREOF

(71) Applicant: Tang Chou Industrial Co., Ltd., Nantou County (TW)

(72) Inventor: Mou-Tang Liou, Taichung (TW)

(73) Assignee: Tang Chou Industrial Co., Ltd., Nantou County (TW)

( * ) Notice: Subject to any disclaimer, the term of this patent is extended or adjusted under 35 U.S.C. 154(b) by 185 days.

(21) Appl. No.: 16/024,971

(22) Filed: Jul. 2, 2018

(65) Prior Publication Data
US 2020/0002145 A1   Jan. 2, 2020

(51) Int. Cl.
  *B66F 15/00* (2006.01)
  *B65G 7/02* (2006.01)
  *B25C 11/00* (2006.01)

(52) U.S. Cl.
  CPC .............. *B66F 15/00* (2013.01); *B65G 7/02* (2013.01); *B25C 11/00* (2013.01)

(58) Field of Classification Search
  CPC ........... B66F 15/00; B25C 11/00; B65G 7/02
  See application file for complete search history.

(56) References Cited

U.S. PATENT DOCUMENTS

| | | | | | |
|---|---|---|---|---|---|
| 1,375,751 | A | * | 4/1921 | Grannis | B25B 27/00 254/25 |
| 2,379,387 | A | * | 6/1945 | Tessier | B25B 27/02 254/131 |
| 2,625,370 | A | * | 1/1953 | Huggins | A01B 1/04 254/131.5 |
| 2,921,773 | A | * | 1/1960 | Hoelzer | B66F 15/00 254/129 |
| 4,929,113 | A | * | 5/1990 | Sheu | F16C 11/045 403/157 |
| 5,820,288 | A | * | 10/1998 | Cole | B25G 1/063 403/97 |
| 6,644,627 | B1 | * | 11/2003 | Forrester | B66F 15/00 254/131 |
| 7,278,626 | B1 | * | 10/2007 | Chang | B66F 15/00 254/25 |
| 8,342,482 | B2 | * | 1/2013 | Smith | B66F 15/00 254/131.5 |

(Continued)

FOREIGN PATENT DOCUMENTS

TW   I340685 B   4/2011

*Primary Examiner* — Tyrone V Hall, Jr.
(74) *Attorney, Agent, or Firm* — Alan D. Kamrath; Karin L. Williams; Mayer & Williams PC

(57) ABSTRACT

A plying tool includes a main body including a first joining portion and a second joining portion and a plying member set including a first and second plying member movably and releasably connected with the main body. The first and second plying members are movable relative to each other and adapted to connect with the main body in a first arrangement with the first plying member connected with the first joining portion and the second plying member connected with the second joining portion respectively, and a second arrangement with the first plying member connected with the second joining portion and the second plying member connected with the first joining portion respectively.

12 Claims, 10 Drawing Sheets

(56) References Cited

U.S. PATENT DOCUMENTS

| | | | | |
|---|---|---|---|---|
| 8,434,739 B1* | 5/2013 | Connolly | ................ | B66F 15/00 |
| | | | | 254/130 |
| D786,042 S * | 5/2017 | Bridges | ............................ | D8/14 |
| 10,259,108 B2* | 4/2019 | Duncan | ................... | B25B 27/04 |
| 10,344,488 B2* | 7/2019 | Bridges | .................... | B25B 27/04 |
| 2007/0169590 A1* | 7/2007 | Cole | ........................ | B25F 1/04 |
| | | | | 81/177.8 |
| 2008/0179576 A1* | 7/2008 | Cole | ....................... | B25C 11/00 |
| | | | | 254/26 R |
| 2010/0140575 A1* | 6/2010 | Liou | ....................... | B66F 15/00 |
| | | | | 254/131.5 |
| 2010/0207081 A1* | 8/2010 | Liou | ....................... | B25D 1/00 |
| | | | | 254/129 |
| 2012/0175574 A1* | 7/2012 | Liou | ....................... | B25F 1/00 |
| | | | | 254/129 |
| 2017/0144876 A1* | 5/2017 | Kasan | .................... | B66F 15/00 |

* cited by examiner

PRYING TOOL CAPABLE OF CHANGING ARRANGEMENT OF PRYING MEMBERS THEREOF

BACKGROUND OF THE INVENTION

1. Field of the Invention

The present invention relates to a double-hinge device and, particularly, to a double-hinge device including first and second hinges adapted to be releasably fixed relative to each other.

2. Description of the Related Art

The present invention relates to a plying tool and, particularly, to a plying tool including plying members adapted to be moved to change their arrangements with respect to one another.

TW Pat. No. 1340685 shows a plying tool including two plying members adapted to be adjusted for creating various sized spaces between the two plying member. When the two plying members are placed very near to each other, a space between therebetween is not small.

The present invention is, therefore, intended to obviate or at least alleviate the problems encountered in the prior art.

SUMMARY OF THE INVENTION

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the public generally, and especially the scientists, engineers and practitioners in the art who are not familiar with patent or legal terms or phraseology, to determine quickly from a cursory inspection the nature and essence of the technical disclosure. The abstract is neither intended to define the invention, which is measured by the claims, nor is it intended to be limiting as to the scope of the invention in any way.

DETAILED DESCRIPTION OF THE INVENTION

Figure 1:
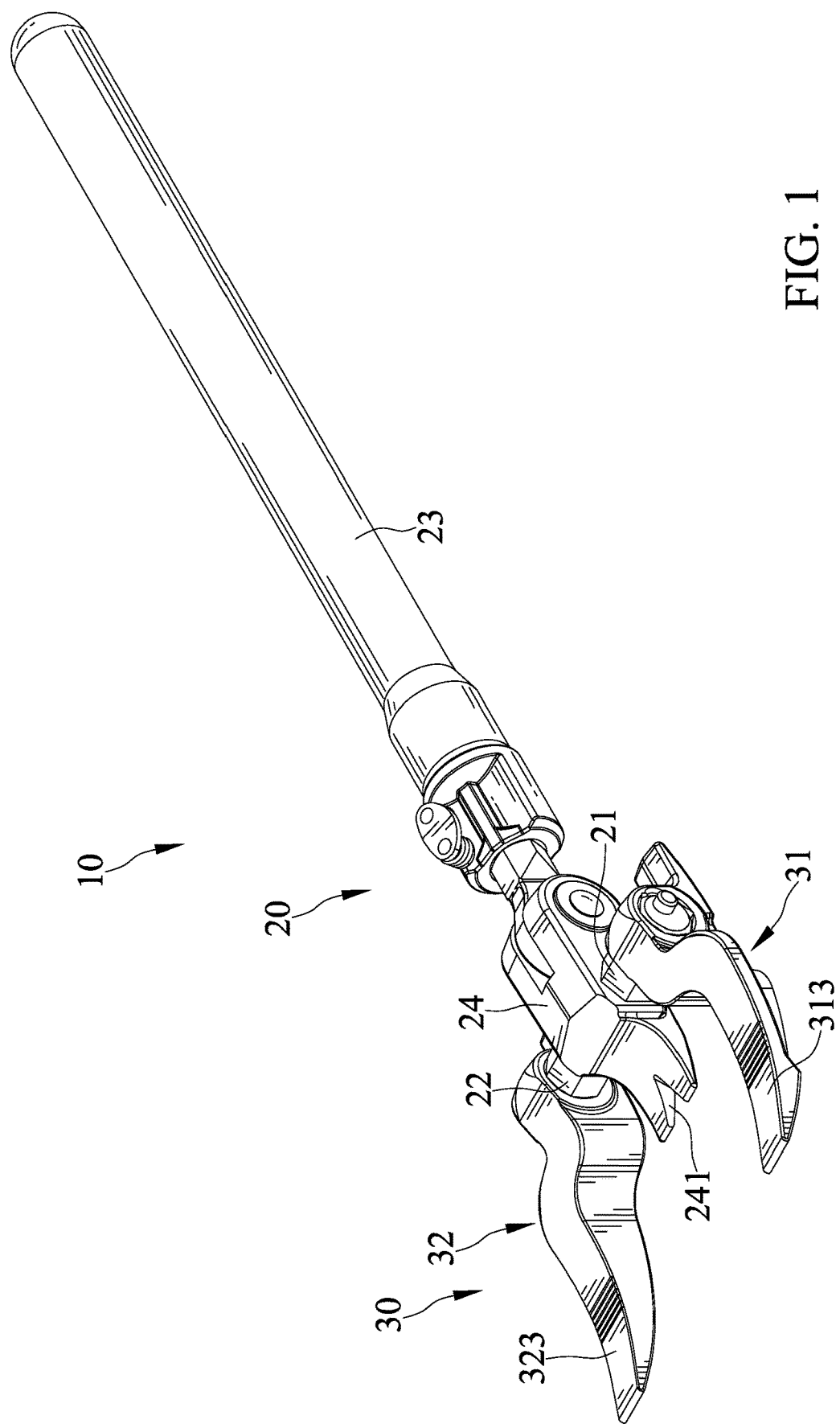
FIG. 1 is a perspective view of a plying tool in accordance with a first embodiment of the present invention.
Figure 2:
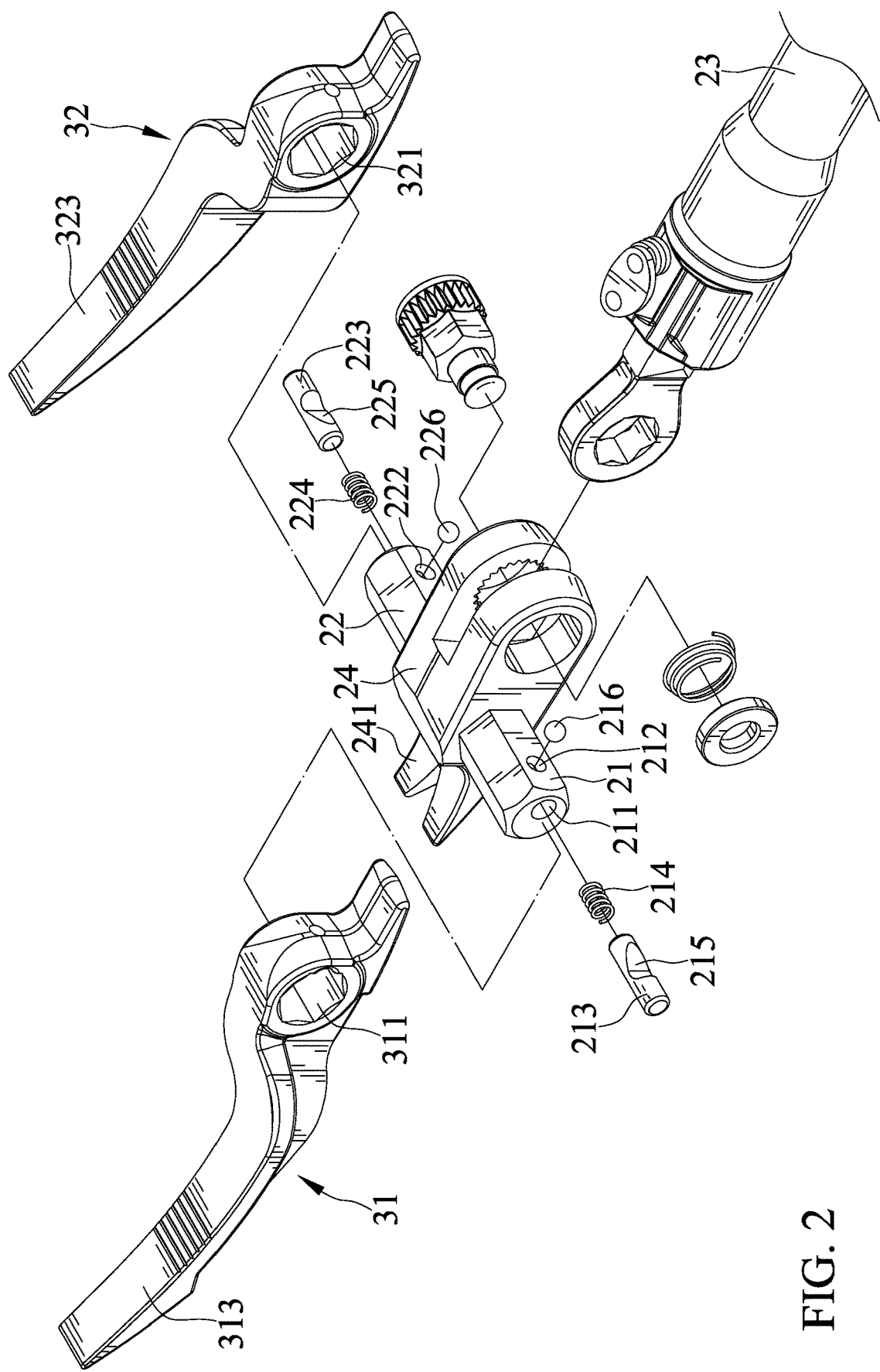
FIG. 2 is an exploded perspective view of the plying tool of the first embodiment.
Figure 3:
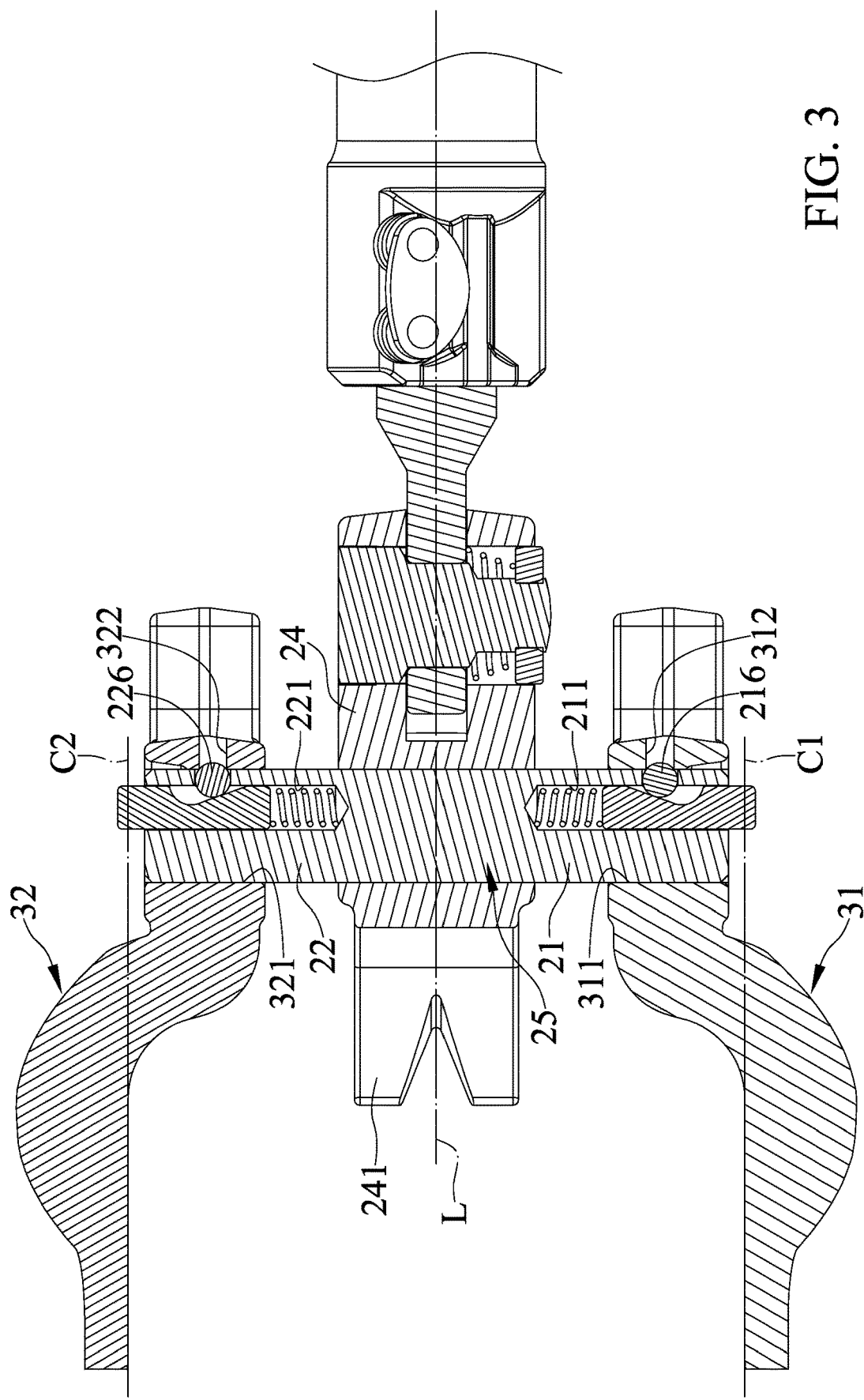
FIG. 3 is a cross-sectional view showing plying members of the first embodiment in a first arrangement with a first plying member retained on a first joining portion and a second plying member retained on a second joining portion respectively.

FIGS. 1 through 8 show a plying tool 10 in accordance with a first embodiment of the present invention. The plying tool 10 includes a main body 20 and a plying member set 30.

The main body 20 extends longitudinally along an axis L. The main body 20 includes a first joining portion 21 and a second joining portion 22 extending transversely to the axis L and disposed on opposite sides of the axis L. The main body 20 includes a handle 23 and a mounting seat 24 with a plying structure 241 pivotally connected with each another. The mounting seat 24 is connected with a rod 25 which includes two ends respectively forming the first and second joining portions 21 and 22. The mounting seat 24 and the rod 25 are connected in a manner that they don't rotate with respect to each other. The mounting seat 24 has a wedge-shaped working end. The plying structure 241 includes two prongs.

Figure 7:
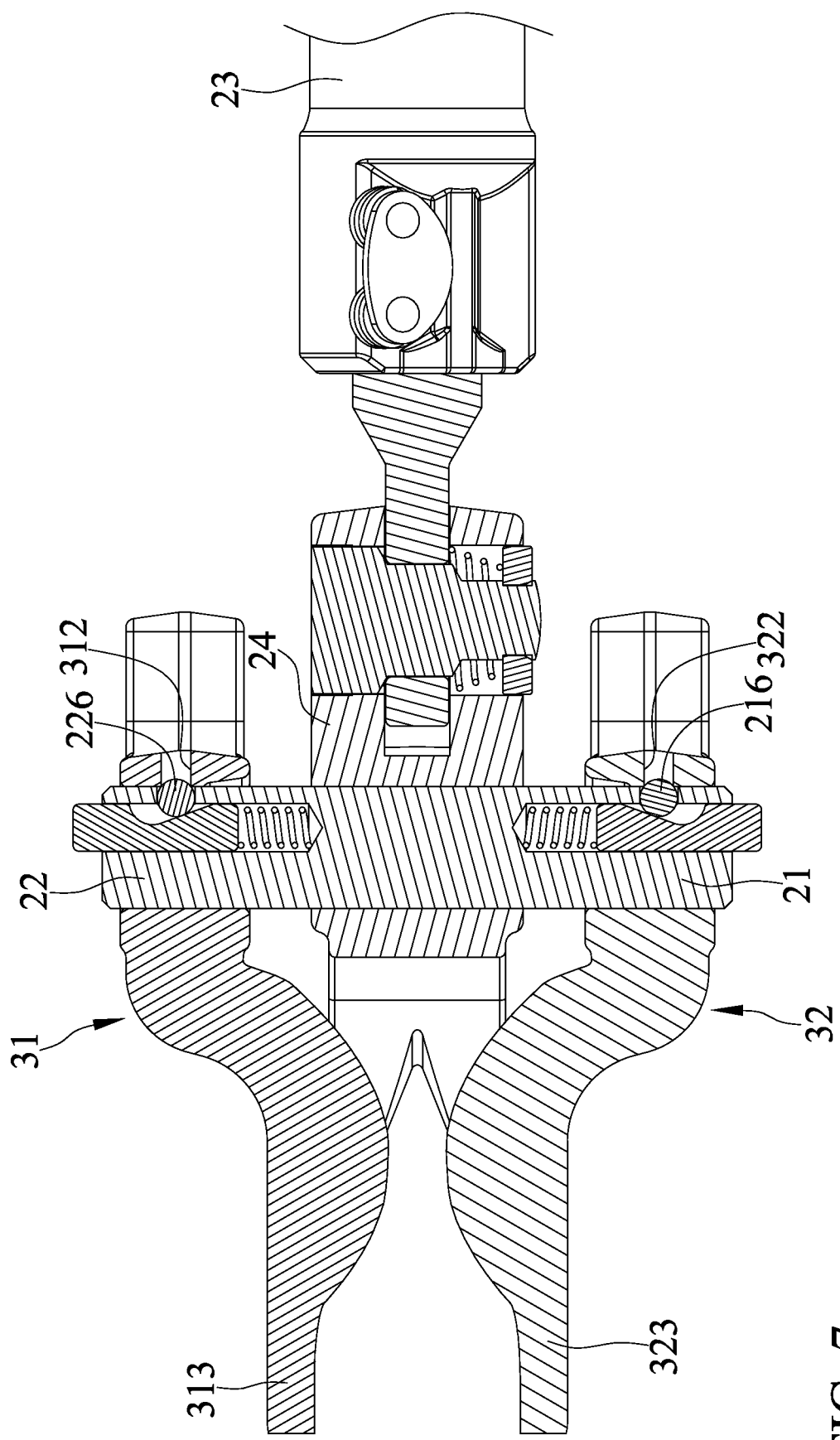
FIG. 7 is a cross-sectional view showing the plying members of the first embodiment in a third arrangement with the first plying member retained on the second joining portion and the second plying member retained on the first joining portion respectively.
Figure 8:
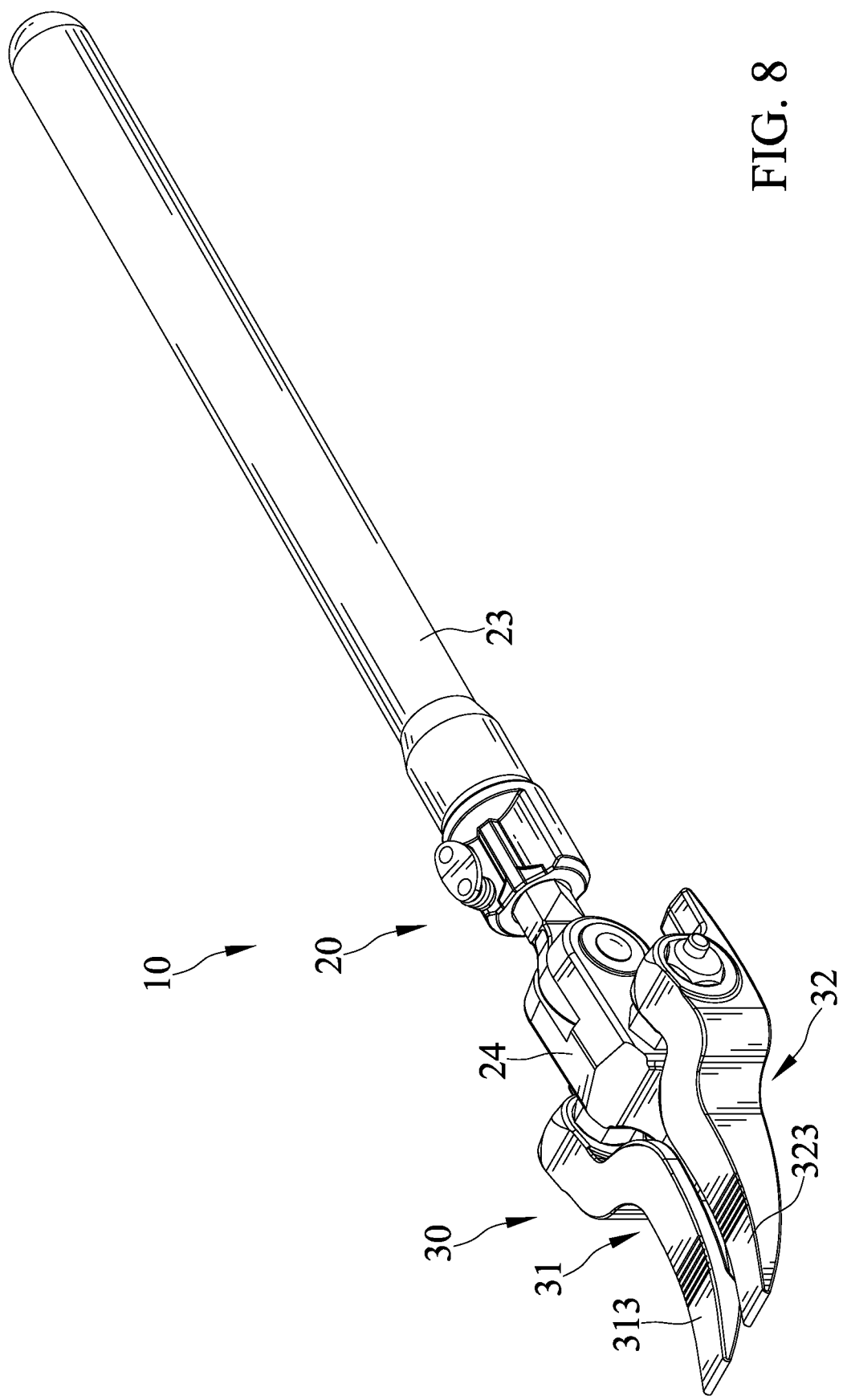
FIG. 8 is a perspective view showing the plying members of the first embodiment in the third arrangement.

The prying member set 30 includes a first and second prying member 31 and 32 movably and releasably connected with the main body 20. The first and second prying member 31 and 32 are mirror images to each other. The first and second prying members 31 and 32 are movable relative to each other and adapted to connect with the main body 20 in a first arrangement with the first prying member 31 connected with the first joining portion 21 and the second prying member 32 connected with the second joining portion 22 respectively, and a second arrangement with the first prying member 31 connected with the second joining portion 22 and the second prying member 32 connected with the first joining portion 21 respectively. FIGS. 7 and 8 show the first and second prying members 31 and 32 in the second arrangement are in a spaced relationship with a smallest gap therebetween. The first and second prying members 31 and 32 respectively include a prying portion 313 and 323 with a surface facing oppositely and disposed on a reference axis C1 and C2. The first and second prying members 31 and 32 respectively have a connecting portion 311 and 321 which is configured to connect with the main body 20 and which is in an offset position from the reference axis C1 and C2 corresponding thereto. The first and second prying members 31 and 32 include the connecting portions 311 and 321 thereof in the form of a through hole. The first and second joining portions 21, 22 each are insertably engaged with the connecting portions 311 and 321 of the first and second prying members 31 and 32. The first and second prying members 31 and 32 respectively include a hole 312 and 322. The first and second joining portions 21 and 22 respectively include a compartment 211 and 221 with an opening at a distal end thereof, a through aperture 212 and 222 extending radially from the compartment 211 and 221, and a retaining mechanism for stopping movement of one of the first and second prying members 31 and 32 including an actuating member 213 and 223 movably disposed in the compartment 211 and 221 and a detent 216 and 226 movably disposed in the through aperture 212 and 222 and movable, in response to movement of the actuating member 213 and 223, to a retaining position extending out of the through aperture 212 and 222 and partially held by the hole 312 and 322 corresponding thereto and a releasing position disengaged from the hole 312 and 322. Each of the actuating members 213 and 223 has an inclined support surface 215 and 225 supporting the detent 216 and 226 corresponding thereto. Each of the actuating members 213 and 223 is urged by an elastic member 214 and 224.

Figure 9:
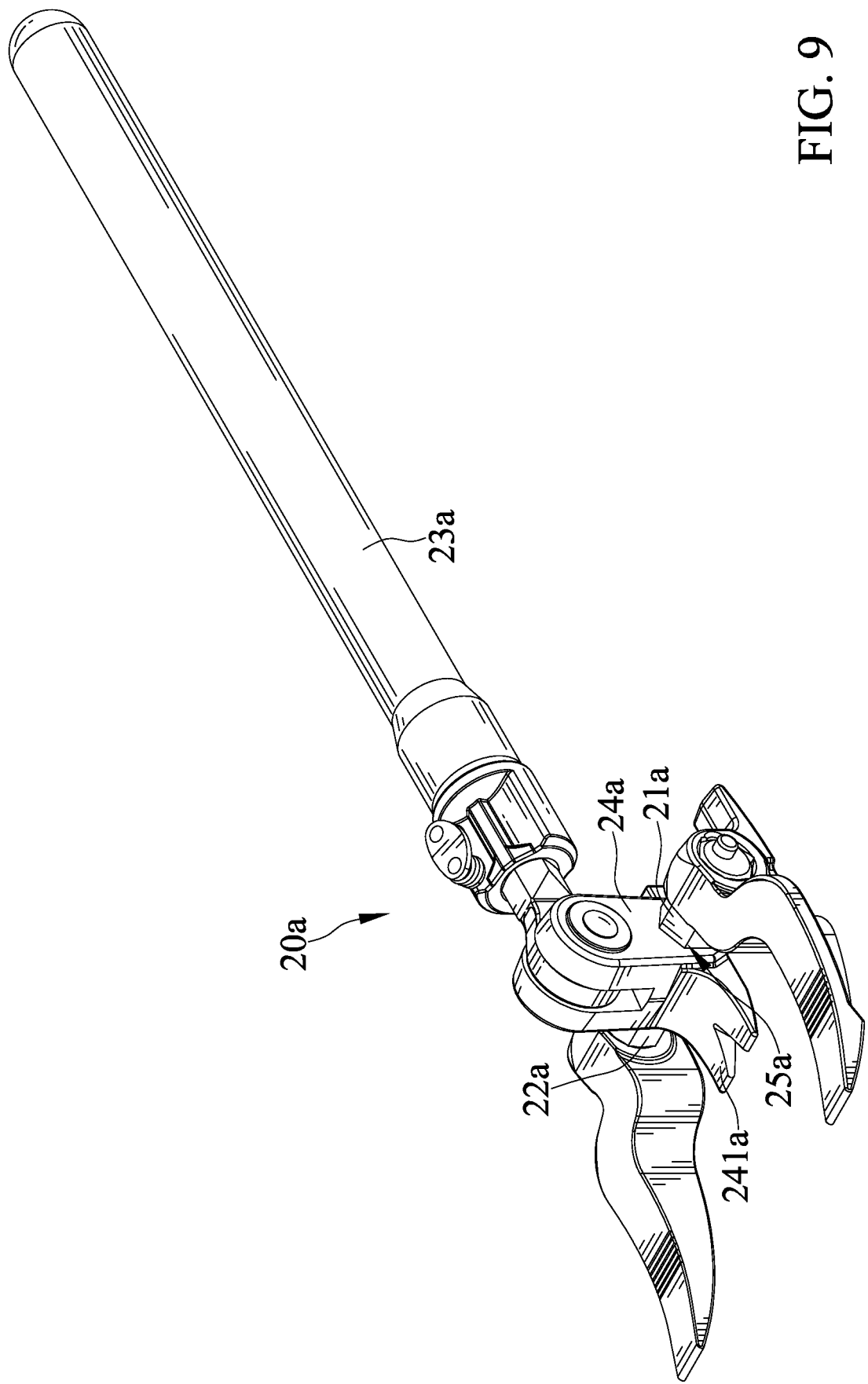
FIG. 9 is a perspective view of a plying tool in accordance with a second embodiment of the present invention.
Figure 10:
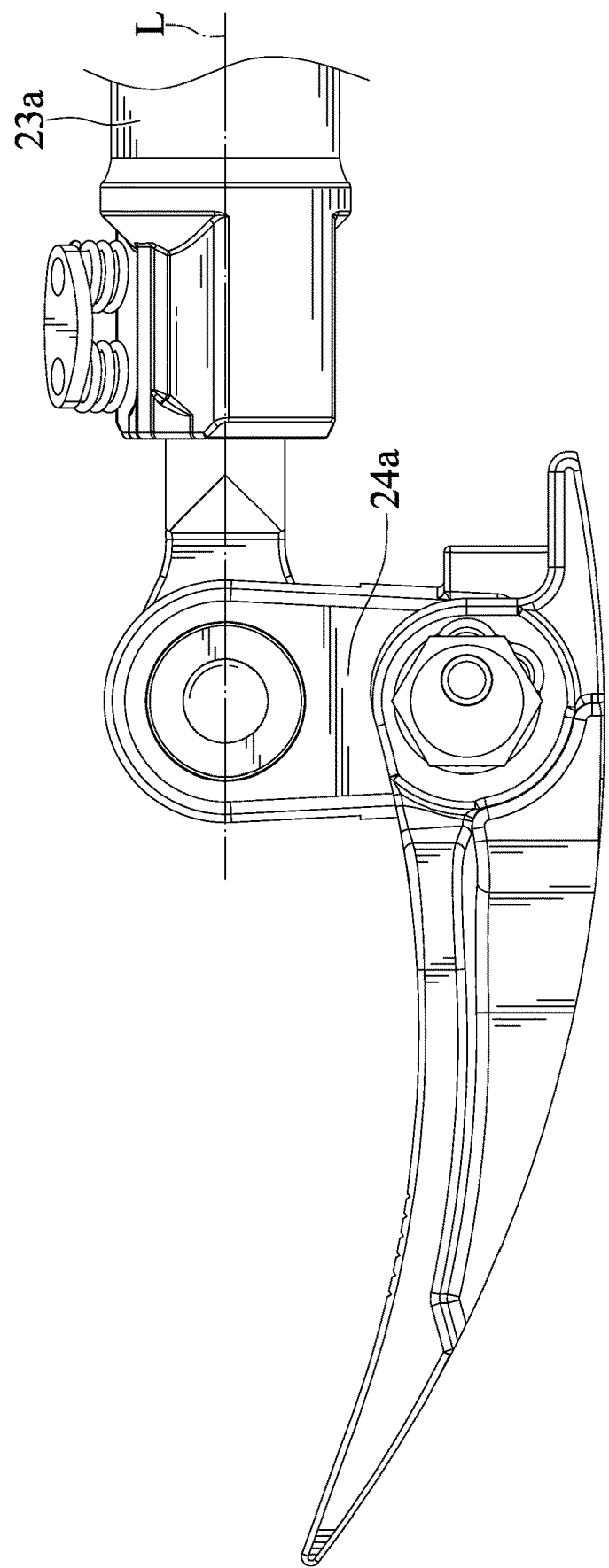
FIG. 10 is a side view of the plying tool of the second embodiment.

FIGS. 9 and 10 show a plying tool in accordance with a second embodiment of the present invention, and the same numbers are used to correlate similar components of the first embodiment, but bearing a letter a. The second embodiment includes a main body 20a. The main body 20a includes a first joining portion 21a and a second joining portion 22a. The main body 20 includes a handle 23a and a mounting seat 24a with a plying structure 241a pivotally connected with each another. The mounting seat 24a is connected with a rod 25a which includes two ends respectively forming the first and second joining portions 21a and 22a. The mounting seat 24a and the rod 25a are connected in a manner that they don't rotate with respect to each other. The mounting seat 24a has a wedge-shaped working end. The plying structure 241a includes two prongs. The second embodiment differentiates from the first embodiment in that the mounting seat 24a is disposed in a standing position and not aligned along the handle 23a, whereas FIG. 1 shows that mounting seat 24 disposed in a lying position.

Figure 4:
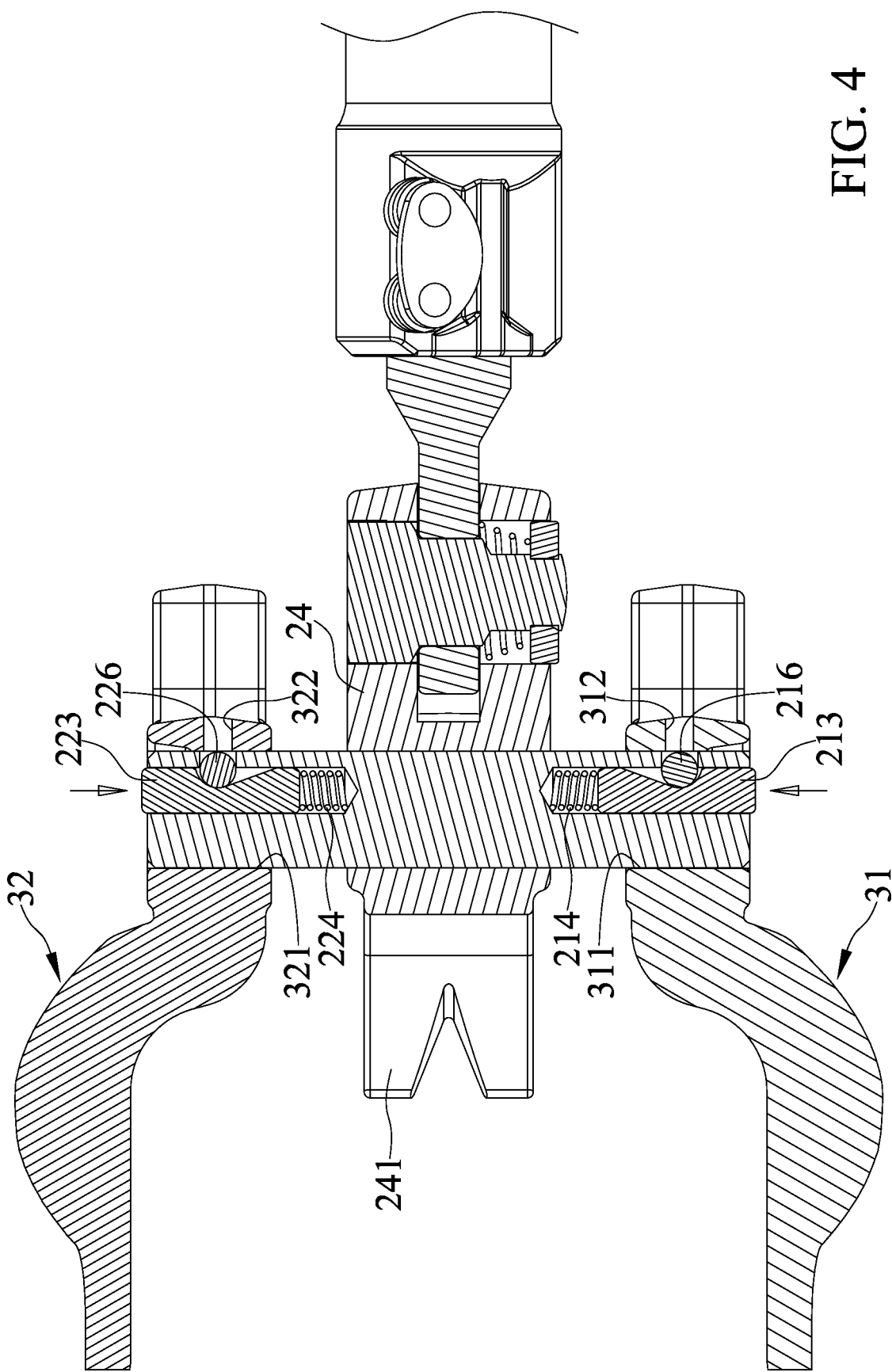
FIG. 4 is a cross-sectional view illustrating the operation of positioning mechanisms of the first embodiment.
Figure 5:
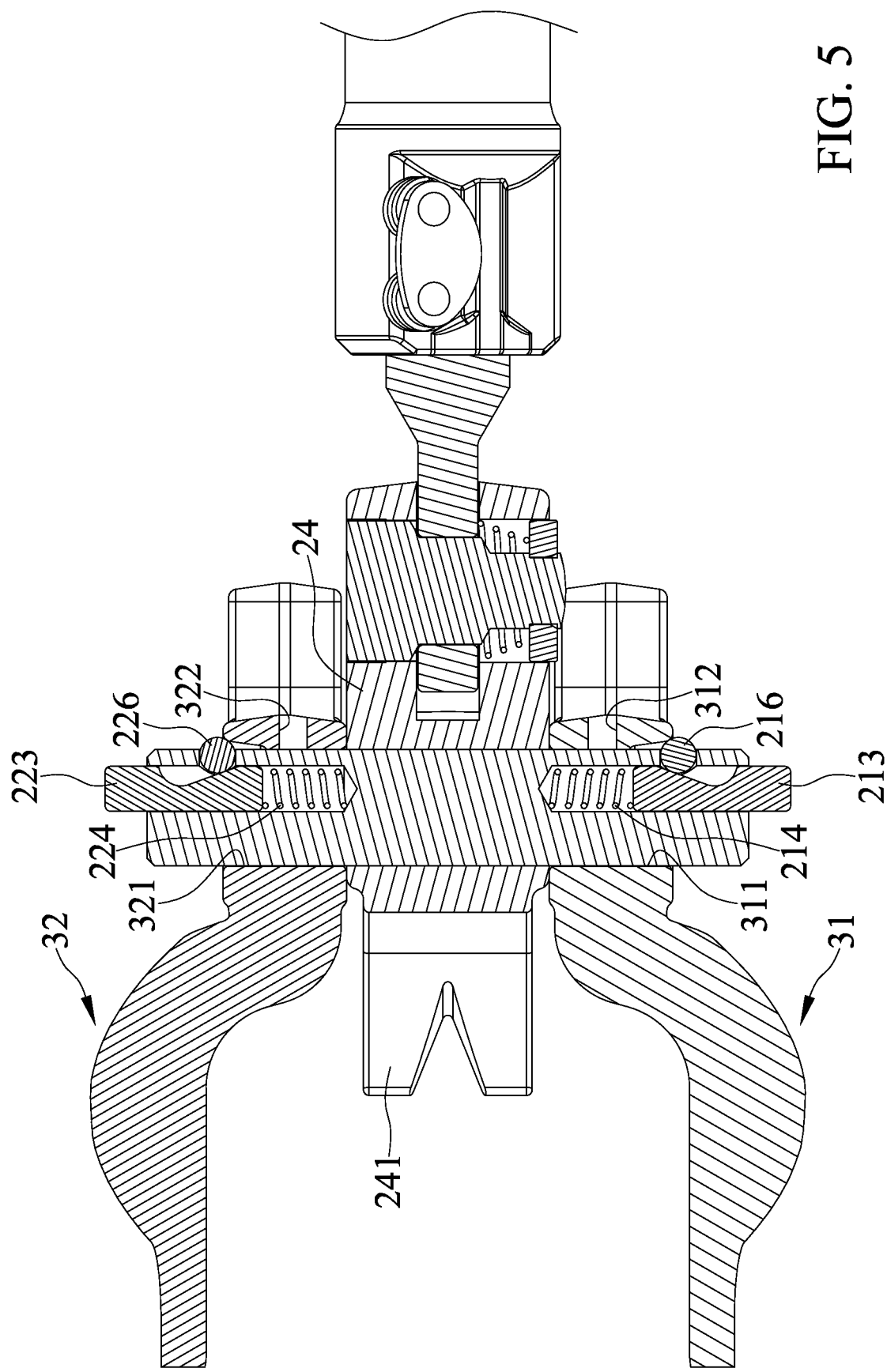
FIG. 5 is a cross-sectional view showing the plying members of the first embodiment in a second arrangement.
Figure 6:
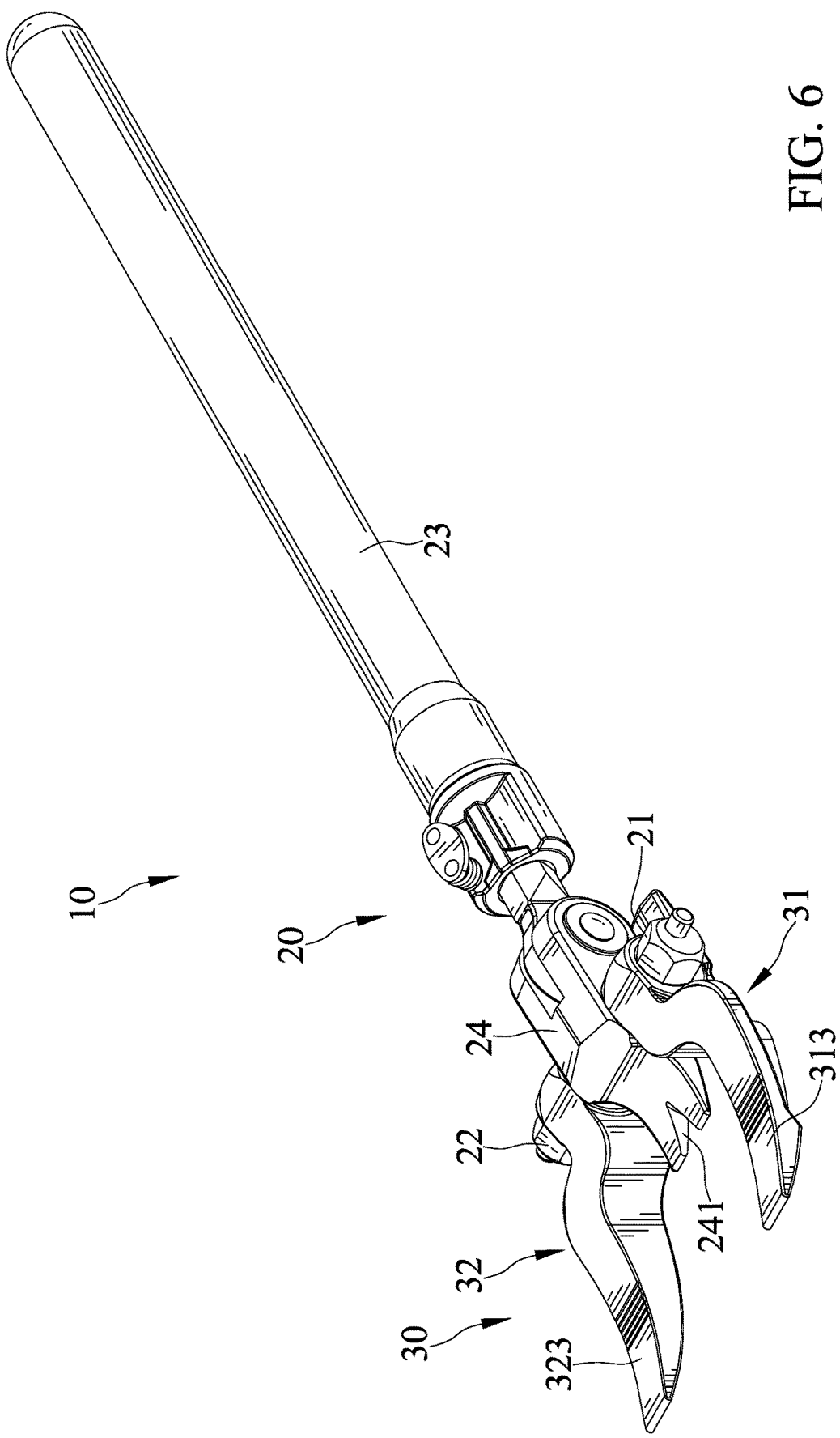
FIG. 6 is a perspective view showing the plying members of the first embodiment in the second arrangement.

In view of the forgoing, the first and second plying member 31 and 32 are movable relative to each other, as shown in FIGS. 4 and 6 and adapted to connect with the main body 20 in a first arrangement with the first plying member 31 connected with the first joining portion 21 and the second plying member 32 connected with the second joining portion 22 respectively, as shown in FIGS. 4 and 6, and a second arrangement with the first plying member 31 connected with the second joining portion 22 and the second plying member 32 connected with the first joining portion 21 respectively, as shown in FIG. 7. In this regard, the first and second plying members 31 and 32 can exchange positions. Furthermore, the first and second plying members 31 and 32 in the second arrangement are in a spaced relationship with a smallest gap therebetween. Because the first and second plying members 31 and 32 are specially designed, the smallest gap is smaller than conventional smallest gaps.

The foregoing is merely illustrative of the principles of this invention, and various modifications can be made by those skilled in the art without departing from the scope and spirit of the invention.

What is claimed is:

1. A prying tool comprising:
a main body extending longitudinally along an axis and including a first joining portion and a second joining portion, wherein the first and second joining portions extend transversely to the axis and are disposed on opposite sides of the axis;
a prying member set including a first and a second prying member movably and releasably connected with the main body,
wherein the first and the second prying members are movable relative to each other and adapted to connect with the main body in a first arrangement with the first prying member connected with the first joining portion and the second prying member connected with the second joining portion respectively, and a second arrangement with the first prying member connected with the second joining portion and the second prying member connected with the first joining portion respectively,
wherein each of the first and second prying members includes a connecting portion connected with the main body and a prying portion,
wherein the first and the second prying members has an inner side and an outer side, wherein the inner sides of the first and the second prying members face oppositely,
wherein the inner side on the prying portion of the first prying member extends along a first reference axis, wherein the first prying member is bent such that it includes a curved portion extending between and transversely to the connecting portion and the prying portion and the inner side on the connecting portion is offset from the first reference axis, and
wherein the inner side on the prying portion of the second prying member extends along a second reference axis, and wherein the second prying member is bent such that it includes a curved portion extending between and transversely to the connecting portion and the prying portion and the inner side on the connecting portion is offset from the first reference axis.

2. The prying tool as claimed in claim 1, wherein the connecting portions of the first and the second prying members are disposed between the first and second reference axes when the first and the second prying members are connected with the first and the second joining portions in the first arrangement, wherein the connecting portions of the first and the second prying members are disposed outside the first and second references axes when the first and the second prying members are connected with second and the first joining portions in the second arrangement.

3. The prying tool as claimed in claim 2, wherein the first and second prying member are mirror images to each other.

4. The prying tool as claimed in claim 1, wherein the first and second prying members include the connecting portions thereof in the form of a through hole, and wherein the first and second joining portions each are insertably engaged with the connecting portions of the first and second prying members.

5. The prying tool as claimed in claim 1, wherein the first and second prying members respectively include a hole, wherein the first and second joining portions respectively include a compartment with an opening at a distal end thereof, a through aperture extending radially from the compartment, and a retaining mechanism for stopping movement of one of the first and second prying members including an actuating member movably disposed in the compartment and a detent movably disposed in the through aperture and movable, in response to movement of the actuating member, to a retaining position extending out of the through aperture and partially held by the hole corresponding thereto and a releasing position disengaged from the hole, wherein the actuating member has an inclined support surface supporting the detent corresponding thereto, and wherein the actuating member is urged by an elastic member.

6. The prying tool as claimed in claim 5, wherein the connecting portions of the first and the second prying members are disposed between the first and second reference axes when the first and the second prying members are connected with the first and the second joining portions in the first arrangement, wherein the connecting portions of the first and the second prying members are disposed outside the first and second references axes when the first and the second prying members are connected with second and the first joining portions in the second arrangement.

7. The prying tool as claimed in claim 6, wherein the first and second prying member are mirror images to each other.

8. The prying tool as claimed in claim 1, wherein the main body includes a handle and a mounting seat with a prying structure pivotally connected with each another, and wherein the mounting seat is connected with a rod which includes two ends respectively forming the first and second joining portions.

9. The prying tool as claimed in claim 8, wherein the connecting portions of the first and the second prying members are disposed between the first and second reference axes when the first and the second prying members are connected with the first and the second joining portions in the first arrangement, wherein the connecting portions of the first and the second prying members are disposed outside the first and second references axes when the first and the second prying members are connected with second and the first joining portions in the second arrangement.

10. The prying tool as claimed in claim 9, wherein the first and second prying member are mirror images to each other.

11. The prying tool as claimed in claim 8, wherein the first and second prying members include the connecting portions thereof in the form of a through hole, and wherein the first and second joining portions each are insertably engaged with the connecting portions of the first and second prying members.

12. The prying tool as claimed in claim 8, wherein the first and second prying members respectively include a hole, wherein the first and second joining portions respectively include a compartment with an opening at a distal end thereof, a through aperture extending radially from the compartment, and a retaining mechanism for stopping movement of one of the first and second prying members including an actuating member movably disposed in the compartment and a detent movably disposed in the through aperture and movable, in response to movement of the actuating member, to a retaining position extending out of the through aperture and partially held by the hole corresponding thereto and a releasing position disengaged from the hole, wherein the actuating member has an inclined support surface supporting the detent corresponding thereto, and wherein the actuating member is urged by an elastic member.

* * * * *